United States Patent Office 3,051,669
Patented Aug. 28, 1962

3,051,669
AQUEOUS COATING COMPOSITIONS FOR PRODUCTION OF SHELL MOULDS AND PROCESS FOR PREPARING SAME
Harold Garton Emblem, Grappenhall, near Warrington, Norman Duncan Gerard Mountford, Donington, and Charles William Morley, Alvaston, England, assignors to Rolls-Royce Limited, Derby, England, a company of Great Britain
No Drawing. Filed Nov. 2, 1959, Ser. No. 850,068
Claims priority, application Great Britain Nov. 5, 1958
8 Claims. (Cl. 260—17)

This invention relates to improvements in the preparation of moulds for casting metals and is concerned with processes of the kind in which a mould structure is formed around an expendable pattern such as a wax pattern. The invention provides an improved method for the production of what may be termed "shell moulds." It is known to produce shell moulds by applying to the pattern a series of coatings and these shell moulds may be sufficiently thick to permit metal to be cast therein without any external support, or with a loose refractory external support.

This invention is for a new type of coating composition for a wax pattern which may be built up into a shell by a series of coatings.

According to this invention, there is provided a coating composition for the production of shell moulds made from a slurry of finely divided refractory powder, an aqueous binding liquid comprising a mixture of a substantially electrolyte-free silica aquasol with an anionic or non-ionic emulsion of unplasticised polyvinyl acetate, and an aqueous solution of sodium carboxy methyl cellulose together with an anionic wetting agent.

Preferably the proportion of aquasol to emulsion is from substantially 4:1 to substantially 5:1.

In another aspect of this invention, there is provided a process for the production of shell moulds for casting metals comprising applying a coating composition as defined above to an expendable pattern, dusting on to the coated pattern a coarse refractory material, allowing the coated pattern to dry, then repeating these operations until a shell mould of the desired thickness is obtained.

The coating composition may be applied to the pattern as an initial coating or may be applied thereto after the pattern has been initially coated with another material or suitable composition in known manner. It is preferred, however, to give the pattern an initial coating with a coating composition according to this invention and allow this coating to dry without subsequent dusting before proceeding to build up the shell mould by repeated applications of the same coating composition followed by dusting.

Examples of suitable refractory powdered materials for the composition are sillimanite, silica and zircon. Examples of suitable coarse refractory materials for dusting on the pattern are fireclay grog and sillimanite.

In the aqueous binding liquid used in the coating composition the silica aquasol forms a high temperature bond and the other components give both "green strength" and strength at intermediate temperatures. The preferred silica aquasols are made by removing the alkali from sodium silicate by means of an ion-exchange resin. Such silica aquasols are substantially electrolyte-free, have a high silica content of the order of 15 percent by weight or greater, a low silica particle size of the order of 250 A (Angstrom units) and a pH of approximately 10. Sodium carboxy methyl cellulose prevents re-solution of a film from a polyvinyl acetate emulsion and results in a stronger film being formed. The resulting strong film at room temperatures gives a wider choice of fine refractories to be incorporated in the coating composition.

The polyvinyl acetate must be dispersed in the form of an aqueous anionic or non-ionic emulsion. On drying, a rigid film must be formed and the emulsion must, therefore, be unplasticised. As silica aquasols have a pH in the range 9–11, the emulsion must be stable in this range and no mutual precipitation must occur on mixing with the silica aquasol and the sodium carboxy methyl cellulose solutions. This requires an anionic or non-ionic polyvinyl acetate emulsion, as these emulsions are stable over a wide pH range and will tolerate the presence of large amounts of other colloids. Preferred emulsions are concentrated polyvinyl acetate emulsions which are weakly anionic and with a narrow polymer particle size range.

Anionic polyvinyl acetate emulsions are preferable as they are most tolerant to other colloids.

The narrow polymer particle size range makes the properties of the composition more consistent i.e. repeatable from batch to batch.

To obtain satisfactory high temperature strength, the proportion of silica aquasol must be high. So that this will not dilute too much, the proportion of emulsion and silica aquasol may conveniently be fixed roughly within the limits of 1:4 and 1:5 parts by weight.

As large volumes of sodium carboxy methyl cellulose solutions give a precipitate with silica aquasols, it is essential that the volume of this solution added to the mixture of silica aquasol and polyvinyl acetate emulsion be as small as possible. This requires the sodium carboxy methyl cellulose solution to be as concentrated as is practicable and because of the polyvinyl acetate emulsion, a material with a low degree of polymerisation should be used, to prevent co-precipitation. If the sodium carboxy methyl cellulose solution is too concentrated, local precipitation may take place on addition of this solution to the mixture of silica aquasol and polyvinyl acetate emulsion. This will be irreversible if silica is precipated. Irreversible precipitation may be avoided by the use of solutions of low polymer sodium carboxy methyl cellulose preferably not exceeding a concentration of 5% w./v. The sodium carboxy methyl cellulose used must be substantially free from inorganic sodium salts (usually sodium chloride) formed as by-products during manufacture. For convenience, viscosity measurements may be used to characterise the preferred molecular weight distribution of the sodium carboxy methyl cellulose. The preferred sodium carboxy methyl cellulose is one for which the viscosity of a 1% solution (dry weight), at 25° C. is 7–15 centipoises. For a sodium carboxy methyl cellulose meeting this requirement it was found in practice that no difficulties from precipitation effects arose if the volume of the silica aquasol used was more than eight times the volume of the 5% w./v. sodium carboxy methyl cellulose solution. Exact limits necessary to avoid precipitation are difficult to define, as they are influenced by molecular weight variations occurring during manufacture of the constituent.

Compositions made from the preferred sodium carboxy methyl cellulose have a useful life of 4–5 days. This can be extended further by adding water to make good losses due to evaporation. The use of sodium carboxy methyl cellulose of higher molecular weight gives coating compositions which on standing overnight become very thick.

The addition of a wetting agent is essential both to wet thoroughly the refractory powder and to help the composition wet the pattern. Non-ionic wetting agents gave poor results but anionic wetting agents may be used successfully, the sulphosuccinate type being preferred because of their high wetting ability. Sodium di (2 ethyl hexyl) sulphosuccinate gives good results and does not cause difficulties through precipitation effects. Small amounts of de-foaming agent may be added if desired, C7–C9 aliphatic alcohols being suitable.

All the refractory in the coating composition should preferably pass a 150 mesh B.S. 410: 1943 sieve and it is preferred that all passes a 200 mesh B.S. 410: 1943 sieve. Zircon is preferred because of its good refractory properties but sillimanite or silica are also suitable. The amount of refractory powder in the coating composition should be chosen to form a slurry giving a thin and uniform coating on the pattern (usually of wax). Slurries of this type have a working life of 3–5 days, depending on humidity and ambient temperature.

Coarse refractory powder is essential for dusting on to the coated pattern. If a fine powder is dusted on to the coated pattern, drying of the coating is retarded and the coating bulges or flakes off the pattern in extreme cases. Fireclay grog may be used for the dusting material but sillimanite is preferred. The use of sillimanite eliminates spalling when the shell is fired. The initial dusting operation may be carried out with sillimanite of medium coarseness (−30 +80 I.M.M. standard sieve) and subsequent dusting operations carried out with much coarser sillimanite (−10 +30 I.M.M. standard sieve). At least one dusting operation using −10 +30 I.M.M. standard sieve sillimanite is desirable and two such operations are preferable. At least four dusting operations using −30 +80 I.M.M. standard sieve sillimanite are desirable, each dusting operation being preceded by the application of the coating composition.

While the shell is being built up, the coatings should be allowed t dry slowly and should be practically dry before application of the next coating. It is essential that all the coatings are completely dry before the completed shell is fired. The completed shell mould should be left for at least 24 hours at room temperature to make certain that drying is complete. When drying is complete, the pattern may be removed from the shell by melting, or by dissolving in a suitable solvent, such as trichlorethylene. Before the casting operation, the dewaxed shell should be fired to a temperature of at least 1000° C. to burn out the organic material and render effective the silica binder from the silica aquasol.

A preferred method is the simultaneous dewaxing and firing of a shell mould, prepared using a wax pattern, by placing the coated pattern in a furnace at 1000° C. The shell must be completely dry. Uniform and rapid heating of the mould is essential, so that the layer of wax next to the shell may melt and run out of the mould before the bulk of the wax is heated and expands. The shell must remain in the furnace until all the wax is completely burned out. This will also burn out the polyvinyl acetate and carboxy methyl cellulose and render effective the silica binder from the silica aquasol. A minimum time of 30–60 minutes is required, depending on the size of the shell but much longer times than the minimum are preferable. Shells made around wax patterns weighing up to about 3 lbs. may usually be cast hot without external support. Larger shell moulds may be loosely supported in −10 +30 I.M.M. standard sieve sillimanite or other coarse refractory, after firing, then fired against before casting if the mould is to be hot when casting.

The following examples will illustrate the invention.

EXAMPLE I 800 gms. of a weakly anionic polyvinyl acetate emulsion were placed in a mixing machine and mixed with 3700 ml. of a substantially electrolyte-free silica aquasol. 450 ml. of sodium carboxy methyl cellulose solution were added to the mixture, together with 270 ml. of a 60% solution of sodium di (2 ethyl hexyl) sulphosuccinate. When mixing was complete, 26 lbs. of zircon powder, all passing a 200 mesh B.S. 410: 1943 sieve were added slowly, and mixed to form a smooth slurry. 20 ml. of foam inhibitor were also added. If desired, the zircon powder may be replaced by 17 lbs. of sillimanite all passing a 200 mesh B.S. 410: 1943 sieve.

The weakly anionic polyvinyl acetate emulsion had a solids content of 49–51%, a mean emulsion particle size of 1–2 microns, a pH of 4.5, the molecular weight index of the resin (V.P.L. method) being 1.50–1.60.

The substantially electrolyte-free silica aquasol had a silica content of 30%, a mean silica particle size of 250 A. a pH of 10, and a specific gravity of 1.2.

The sodium carboxy methyl cellulose was free of sodium chloride impurity and gave a 1% solution (dry weight) having a viscosity of 7–15 cp. at 25° C. 5 gms. of this were used per 100 ml. of water.

The foam inhibitor was mixture of C7–C9 aliphatic alcohols, sold under the trade mark "Alphanol" as Alphanol 79 but the same volume of 2 ethyl hexanol may be substituted.

Shell moulds were prepared from the above slurry in the following stages, wax patterns being used. These were cleaned from mould release agent, or washed as necessary.

Stage 1

The cleaned wax patterns were dipped in the coating slurry, the excess coating slurry allowed to drain off and the coated patterns left to dry overnight while the coating hardened. Care was taken to see that drying was uniform and complete, particularly in the recesses in the pattern.

Stage 2

The dried coated patterns from Stage 1 were dipped in the slurry and excess slurry allowed to drain off. While the patterns were still wet, coarse refractory powder (−30 +80 I.M.M. standard sieve sillimanite) was dusted evenly over the patterns which were then allowed to dry in a draught free atmosphere for 5 hours or longer so that hardening of the coating is at least partially complete.

Stage 3

Building of the shell was finished by repitition of Stage 2, 5 or 6 times. The last one or two dusting operations were done with a very coarse refractory powder. For example, as already stated, the earlier dusting operations may be done with −30 +80 I.M.M. standard sieve sillimanite and the final operation or preferably two final operations with −10 +30 I.M.M. standard sieve sillimanite.

The finished shells should be allowed to dry, preferably in a draught free atomsphere, for at least 24 hours before they are dewaxed, to make sure that all the coatings have completely hardened.

EXAMPLE II

To 400 gms. of a weakly anionic polyvinyl acetate emulsion were added 1000 ml. of water and 1000 ml. of substantially electrolyte-free silica aquasol, the mixture being stirred during the addition. 200 ml. of sodium carboxy methyl cellulose solution were now added together with 50 ml. of a 60% solution of sodium di (2 ethyl hexyl) sulphosuccinate.

18 lbs. of fine zircon powder, all passing a 200 mesh B.S. 410: 1943 sieve, were now added slowly to the resulting liquid, which was stirred during the addition. 10 ml. of 2 ethyl hexanol were now added, as foam inhibitor.

The components of the coating composition have the same characteristics as in Example I.

In the above composition, the 1000 ml. of water may be replaced by a trisodium phosphate solution. The trisodium phosphate solution is prepared by dissolving 30 gms. of trisodium phosphate, dried technical grade, in 1000 ml. of water, all of the resulting solution being used. The trisodium phosphate has been found to improve adhesion of the initial coat to the remainder of the shell during the firing operation.

Either of these compositions may be used to complete the formation of the shell after they have been used to apply the initial coating to the expendible pattern.

However, it is preferred that they should be used only for the initial coat, and the shell completed as previously described.

We claim:
1. A coating composition for the production of shell moulds comprising finely divided refractory powder, an aqueous binding liquid comprising a mixture of a substantially electrolyte-free silica aquasol and a non-cationic emulsion of unplastised polyvinyl acetate, an aqueous solution of sodium carboxy methyl cellulose in a concentration not exceeding 5 grams of said sodium carboxy methyl cellulose in 100 milliliters of water, the viscosity of a 1% solution dry weight of the sodium carboxy methyl cellulose at 25° C. being 7–15 centipoises, and an anionic wetting agent, the proportion of aquasol to emulsion being from substantially 4:1 to substantially 5:1 by weight, and the volume of aquasol being more than 8 times the volume of the said aqueous solution.

2. A coating composition for the production of shell moulds comprising finely divided refractory powder, an aqueous binding liquid comprising a mixture of a substantially electrolyte-free silica aquasol and an anionic emulsion of unplasticised polyvinyl acetate, an aqueous solution of sodium carboxy methyl cellulose in a concentration not exceeding 5 grams of said sodium carboxy methyl cellulose in 100 milliliters of water, the viscosity of a 1% solution dry weight of the sodium carboxy methyl cellulose at 25° C. being 7–15 centipoises, and an anionic wetting agent, the proportion of aquasol to emulsion being from substantially 4:1 to substantially 5:1 by weight, and the volume of aquasol being more than 8 times the volume of the said aqueous solution.

3. A coating composition as claimed in claim 1 in which the refractory powder comprises sillimanite.

4. A coating composition as claimed in claim 1 in which the refractory powder comprises silica.

5. A coating composition as claimed in claim 1 in which the refractory powder comprises zircon.

6. A coating composition for the production of shell moulds comprising finely divided refractory powder, an aqueous binding liquid comprising a mixture of a substantially electrolyte-free silica aquasol and a non-cationic emulsion of unplasticised polyvinyl acetate, an aqueous solution of sodium carboxy methyl cellulose in a concentration not exceeding 5 grams of said sodium carboxy methyl cellulose in 100 milliliters of water, the viscosity of a 1% solution dry weight of the sodium carboxy methyl cellulose at 25° C. being 7–15 centipoises, and sodium di (2 ethyl hexyl) sulphosuccinate, the proportion of aquasol to emulsion being from substantially 4:1 to substantially 5:1 by weight, and the volume of aquasol being more than 8 times the volume of the said aqueous solution.

7. A coating composition for the production of shell moulds comprising finely divided refractory powder, an aqueous binding liquid comprising a mixture of substantially electrolyte-free silica aquasol with an anionic emulsion of unplasticised polyvinyl acetate, an aqueous solution of sodium carboxy methyl cellulose in a concentration not exceeding 5 grams of said sodium carboxy methyl cellulose in 100 milliliters of water, the viscosity of a 1% solution dry weight of the sodium carboxy methyl cellulose at 25° C. being 7–15 centipoises, an anionic wetting agent, and a de-foaming agent, the proportion of aquasol to emulsion being from substantially 4:1 to substantially 5:1 by weight, and the volume of aquasol being more than 8 times the volume of the said aqueous solution.

8. A process for producing a coating composition for use in the production of shell moulds comprising forming a slurry of finely divided refractory powder, an aqueous binding liquid comprising a mixture of a substantially electrolyte-free silica aquasol with a non-cationic emulsion of unplasticised polyvinyl acetate, an aqueous solution of sodium carboxy methyl cellulose in a concentration not exceeding 5 grams of said sodium carboxy methyl cellulose in 100 milliliters of water, the viscosity of a 1% solution dry weight of the sodium carboxy methyl cellulose at 25° C. being 7–15 centipoises and an anionic wetting agent, the proportion of aquasol to emulsion being from substantially 4:1 to substantially 5:1 by weight, and the volume of aquasol being more than 8 times the volume of the said aqueous solution.

References Cited in the file of this patent

UNITED STATES PATENTS

| | | |
|---|---|---|
| 2,558,378 | Petry | June 26, 1951 |
| 2,582,740 | Ayers | Jan. 15, 1952 |
| 2,792,604 | Bartlett et al. | Mar. 21, 1957 |
| 2,923,641 | Graf | Feb. 2, 1960 |
| 2,923,990 | Bean | Feb. 9, 1960 |
| 2,926,160 | Kern | Feb. 23, 1960 |